Jan. 28, 1958 A. G. BARHORST 2,821,169
DOG LEASH
Filed April 12, 1956
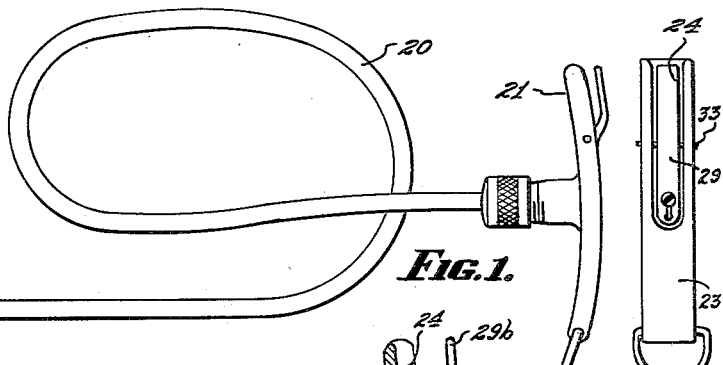
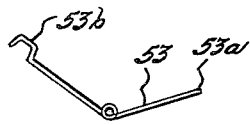
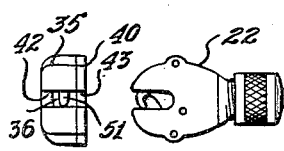
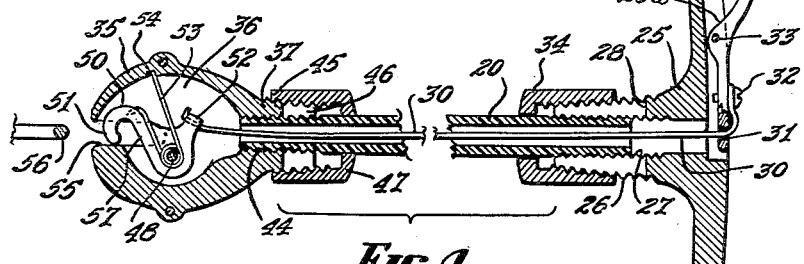
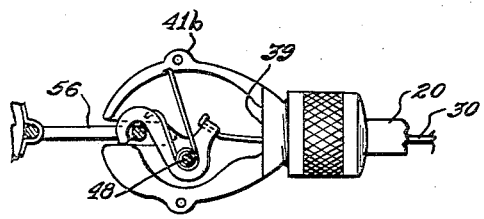
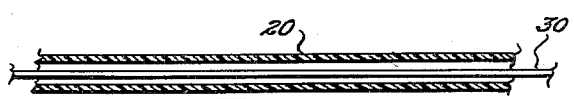
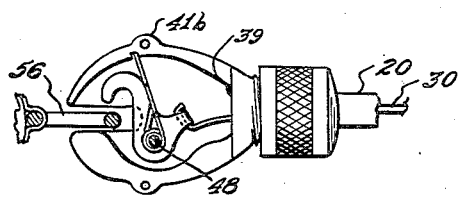
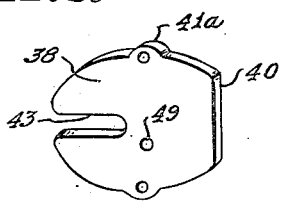
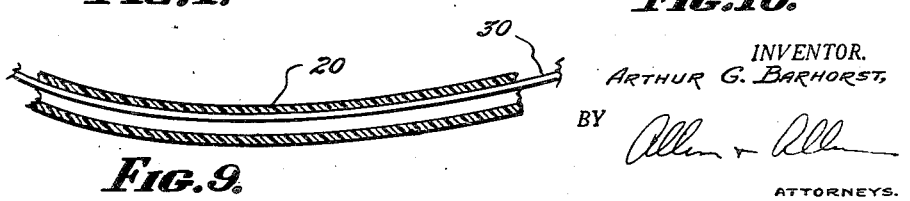
INVENTOR.
ARTHUR G. BARHORST,
BY
ATTORNEYS.

United States Patent Office 2,821,169
Patented Jan. 28, 1958

2,821,169
DOG LEASH
Arthur G. Barhorst, Erlanger, Ky.
Application April 12, 1956, Serial No. 577,817
4 Claims. (Cl. 119—114)

My invention resides in the provision of a dog leash which may be quickly and easily connected to or disconnected from the usual metal ring found on ordinary dog collars.

Although my invention is particularly well suited for use with dogs being handled in field trial work and the like, it will also be apparent that the leash is of general application.

An important object of my invention is to provide a leash which may be easily attached to a dog's collar in such a way that the dog cannot escape from it by rubbing the catch, collar or leash on trees, shrubbery and the like.

Another very important object of my invention is to provide a leash which may be released by the handler without his having to reach down and manipulate the collar itself.

Another important object of my invention is to provide a leash which may be employed with a standard dog collar in such a way that the dog's handler may release the dog from the leash while the collar, bearing the various license plates and so forth, remains on the dog.

Oftentimes during field work the dog will be straining at the leash and, as he and his handler move about prior to receiving the release signal from the field judge, the dog may even be investigating briar patches and the like. When the start signal is given the handler must immediately release the dog for the chase. If the dog is in a briar patch or the like it has heretofore been necessary for the owner or handler to lean over and reach the collar of the dog in order that he might disconnect the leash. In such instances the handler not only might well be scratched on his hands but also he might be scratched about his face and eyes. Accordingly, an important object of this invention is to provide a leash which may be released from the dog's collar even while he is pulling on the leash without the handler having to do anything more than simply actuate a release means located at the hand grip portion of the leash.

These and other objects and advantages of my invention will become apparent to those skilled in the art during the course of the following description and with reference to the accompanying drawing, in which drawing like numerals are employed to designate like parts and in which:

Figure 1 is a perspective view of the dog leash embodying my invention,

Figure 2 is an elevation taken from the right side of Figure 1,

Figure 3 is an elevation taken from the left side of Figure 1,

Figure 4 is a fragmentary sectional view taken lengthwise through the leash and related mechanism, Figure 5 is a perspective view of the lever member employed with my leash, Figure 6 is a fragmentary perspective view emphasizing the mechanism for engaging the collar ring.

Figure 7 is a view similar to that of Figure 6 but showing a different position of the parts, Figure 8 is a fragmentary sectional view showing the position of the leash proper with respect to the trip wire employed therein, Figure 9 is a view similar to that of Figure 8 but showing the respective positions of the leash proper and trip wire when the leash is in a relaxed position, Figure 10 is a perspective view of a plate member used with the invention, and Figure 11 is a perspective view of a spring member employed with the catch mechanism portion of the leash.

Referring now to the figures of the drawing I have indicated my novel dog leash as comprised of a relatively long, flexible member 20 having a hand grip member 21 at one end and a catch mechanism 22 at the other. The member 20 is preferably made of a flexible plastic tube. This tube is threaded at either end so that it may be joined to the hand grip member 21 and catch mechanism 22 as will be described. Tubing of this type is readily available on the market and it is easily threaded.

The hand grip member 21 may be cast as a single unit including the member 23 which is formed with a recess 24 therein and also including the central stub 25 which may have both exterior and interior threads 26 and 27 respectively. Preferably the free end of the portion 25 is slotted in the region of the threads as indicated at 28.

A trip lever 29 having a bearing surface 29a located intermediate its ends is also provided. One end of this lever 29 is provided with an orifice through which a piece of spring wire may be passed and with a bolt by means of which the wire may be securely fastened to the lever. The wire, the function of which will be described shortly in greater detail, is indicated at 30, the orifice at 31 and the bolt at 32. This lever 29 is maintained within the channel 24 of the hand grip portion 23 by means of a pin 33 which passes through the side walls of the member 23 and through the region of the bearing surface 29a.

The threads on the member 20 are designed to be received by the interior threads 27 of the stub portion 25 of the member 23. After these threads have been engaged the nut 34, which has an interior tapered and threaded to cooperate with the exterior threads 26 on the stub 25, may be tightened on the stub portion of the member 23. The result of this, since this stub portion is slotted as indicated at 28, is to force the mating halves of the stub 25 as defined by such slot 28, into a tight squeezing contact with the flexible tube 20, which squeezing action supplements the threaded engagement of the tube 20 and stub 25 so as to insure a very positive engagement of the hand grip portion 21 on the tube 20.

The catch mechanism 22 comprises a housing 35 which may be cast or otherwise formed to provide an interior hollowed portion 36 and a stub 37. The hollowed portion 36 may be closed by a plate 38 which may be bolted or otherwise secured to the member 35. To this end the member 35 is provided with an abutment 39 against which the flat 40 of the plate 38 will rest when securing means have been placed through the ears 41a and 41b of the plate 38 and member 35 respectively.

The members 35 and 38 are provided with mating, U-shaped slots extending inwardly from the forward ends of these members, such slots being indicated at 42 and 43 respectively.

The member 22 is also arranged so that it might be fastened to the flexible tube 20 in the same manner as described in connection with the member 21. To this end the stub 37 is provided with interior threads 44, exterior threads 45 and a slot 46. A nut 47 having threads to engage the exterior threads 45 of the stub 37 is also provided. It will be apparent that the member 35 may be screwed onto the end of the tube 20 and the nut 47 then screwed onto the stub 37 so that not only is the member 35 secured to the tube 20 by the threaded arrangement indicated but also by the squeezing action of the nut 47 on the two halves of the stub 37 defined by the slot 46.

Fixed in the member 35 is a pin 48. The plate 40 has an orifice 49 to receive one end of this pin when the plate is fastened to the member 35. A member 50 is pivotally mounted on the pin 48 within the region of the hollow 36 of the member 35. This member 50 has a hook portion 51 and a projection 52. There is a spring 53 also mounted on the pin 48. The end 53a of this spring bears against a shoulder 54 formed in the member 35 while the end 53b of this spring contacts the member 50 near the hook 51. The spring 53 is so arranged as normally to maintain the hook 51 against the ledge 55 defined by the slot 42 in the member 35.

The wire 30 is secured to the projection 52 of the member 50. This wire is a type which may be readily secured on the market. As earlier described the other end of this wire is fixed to the lever member 29.

When it is desired to secure the dog leash to the metal ring 56 usually found on dog collars it is necessary simply to move this ring 56 against the hook member 51 so that such member will move in a clockwise direction about the pin 48 against the spring 53. When the spring 56 has cleared the end of the hook 51 the spring 33 will again return the end of this hook to the shelf 55 whereupon the leash will be firmly secured to the collar through the member 35 and ring 56. If it is desired for any reason to remove the ring 56 from the catch mechanism by hand, one simply moves the ring rearwardly against the surface 57 of the member 50 so as to again move this member clockwise in opposition to the spring 53. Practically simultaneous with this the user will simply move the ring laterally of the member 35 so that it will exit through the sides of the slots 42 and 43 after which the spring 53 will again snap the hook 51 onto the shelf 55.

Although the catch member 35 may be actuated by hand in the manner just described in order to release it from the ring 56, the principal object of my invention is to release this member 35 from the ring without one's having to manipulate these parts by actual hand contact in the manner just described. This will be accomplished as follows.

After the ring 56 has been engaged by the hook 51 by hand manipulation as above described, it may later become necessary for the handler to release the leash from the dog collar quickly and without having to reach down and manipulate the various members by direct hand contact. It will be apparent that by the arrangement of this invention all the operator will have to do is to depress the lever 29 so as to pull the spring wire 30 to move the member 50 in a clockwise direction about the pin 48 against the spring 53 so as to raise the hook member 51 from the shelf 55 whereupon the ring 56 may slide through the channels 42 and 43 and thus become clear of the leash and its associated mechanism. It will thus be apparent that in the broadest aspects of my invention any tube flexible enough to serve as a practical leash will suffice so long as the latch-pulling mechanism may be suitably secured thereto. Also, in its broadest aspects, my invention contemplates the use of any flexible material 30 so that the leash may be utilized in a normal manner. A very stiff member 30 in a very flexible member 20 would not produce the best results; the members 20 and 30 should be compatible so that the leash in its entirety will present sufficient flexibility to permit the dog to move about.

In the more specific aspects of this invention, however, it is contemplated that the relationship between the tube 20 and wire 30 be such as is indicated in Figures 8 and 9. When the leash is taut as will be the case when the dog is exerting a strain on it the wire 30 will be located substantially centrally of the hollow and flexible member 20.

Under this condition movement of the lever 29 so as to move the end 29b towards the member 23 will result in the member 50 being rocked about the pin 48 to release the ring 56 in the manner described. When, however, the leash is in a relaxed position as illustrated in Figure 9, the wire 30 will slacken so that it will lie against the inner wall of the hollow tube 20. Under this condition even the pressing of the lever end 29b to the bottom of the channel 24 will not pull the member 50 in opposition to the spring 53 sufficient to permit the ring 56 to clear. With these parts of my invention so arranged it is necessary either that the dog be straining at the leash or that the operator pull on the leach so as to make it taut, before actuation of the lever 28 will serve to release the collar ring 56 from the catch mechanism 35.

Furthermore, with the materials preferred and arranged as described, it is possible, without the ring 56 engaged by the member 51, to grasp the housing 22 and member 21 and pull them in opposite directions to make the member 20 taut. Under these conditions it is possible that the wire 30 may be stretched so as to move the member 50 in opposition to the spring 53 whereupon the hooks 51 will move away from the shelf 55. This can't happen, however (without depressing the lever 29b) when the ring 56 is engaged by the hook 51 and there is any tension between the two. This is a unique characteristic of my invention, in its specific embodiment.

In any form of my invention the ring 56 may not be released from the catch mechanism simply by pulling on it. Only when the lever 29 is actuated will the member 56 clear the catch mechanism 35 and then only if there is tension between the ring 56 and hook 51. Apparently the reason why the member 51 may be moved from the shelf 55 simply by moving the members 21 and 22 away from each other in order to make the tube 20 taut, the lever 29 not being actuated, is because there is more resilient stretch in the material comprising the tube 20 than there is in the material comprising the wire 30. But the hook portion 51 is so designed that when the ring 56 is engaged thereby, and there is a pull of the ring 56 against the hook 51, such ring will not free itself of this hook 51 even though the member 20 is taut unless there is a positive force exerted on the member 50 as is accomplished by actuation of the lever 29.

In any event, it will be apparent to those skilled in the art that modifications may be made in this invention without departing from the scope and spirit thereof. It will be further understood that while I have shown this invention as embodied in certain specific structure, I do not intend to be limited to such structure except insofar as it is specifically set forth in the subjoined claims.

Having thus described my invention, what I claim as new and what I desire to protect by United States Letters Patent is:

1. A dog leash comprising a flexible tube; a flexible cable within said tube; a catch mechanism fixed to one end of said tube, said catch mechanism including a latch member having a ring-hold position and a ring-release position, resilient means urging said latch member to its ring-hold position; a trip mechanism fixed to the other end of said tube, said trip mechanism including a release member movable between a release and non-release position; said cable being connected to said latch member and to said release member, said resilient means also normally maintaining said release member in non-release position through the pressure exerted by said release means on said latch member and attached cable; the relationship between said tube and said cable being such that said cable is disposed centrally of said tube when said tube is taut, said cable lying against said tube when said tube is relaxed, whereby upon movement of said release member to release position said cable is actuated to pull said latch member to ring release position against the action of said resilient means only when said tube is taut.

2. The dog leash of claim 1 in which said catch mechanism comprises a housing, a pin in said housing, said latch member being pivoted on said pin, said housing having an open ended slot defining a shelf, and said resilient means normally urging said latch into contact with said shelf.

3. A dog leash comprising a flexible tube, a housing fixed to one end of said tube, a handle fixed to the other end of said tube, a latch member pivoted in said housing intermediate its ends, one end of said latch member defining a hook, the other end of said latch member having a projection, said housing having an open ended slot to receive a ring and defining a shelf, spring means urging said hook into contact with said shelf, said hook being adjacent the open end of said slot and extending from said shelf a distance greater than the thickness of said slot, a lever pivoted to said handle intermediate the ends of said lever, one end of said lever being spaced from said handle, and a flexible wire within said tube, one end of said wire being fixed to said projection and the other end of said wire being fixed to the other end of said lever, the length of said wire being such that movement of said one lever end towards said handle will move the end of said hook against the action of said spring means from said shelf a distance substantially equal to the thickness of said slot when the said tube is taut.

4. A dog leash comprising a flexible tube, a catch means at one end of said tube to engage a ring on a dog collar, release means at the other end of said tube, and a flexible cable within said tube attached to said catch means and to said release means so that actuation of said release means will disengage said catch means from said collar, said tube having a resilient stretch, said cable having a resilient stretch less than that of said tube, and said ring engaging catch means including a hook to receive said ring, the end of said hook extending beneath said ring in the engaged position of said hook and ring.

References Cited in the file of this patent

UNITED STATES PATENTS

| | | |
|---|---|---|
| 2,652,809 | Foster | Sept. 22, 1953 |
| 2,759,758 | Yancey | Aug. 21, 1956 |

FOREIGN PATENTS

| | | |
|---|---|---|
| 10,743 | Great Britain | May 3, 1911 |